United States Patent [19]

Meinig

[11] Patent Number: 5,346,265
[45] Date of Patent: Sep. 13, 1994

[54] COUPLING SLEEVE FOR CONNECTING THIN-WALLED PIPE ENDS

[75] Inventor: Manfred Meinig, Rietheim-Weilheim, Fed. Rep. of Germany

[73] Assignee: METU-System Meinig KG, Rietheim-Weilheim, Fed. Rep. of Germany

[21] Appl. No.: 60,551

[22] Filed: May 13, 1993

[30] Foreign Application Priority Data

May 18, 1992 [DE] Fed. Rep. of Germany ....... 4216403

[51] Int. Cl.⁵ ............................................. F16L 17/04
[52] U.S. Cl. .................................... 285/373; 285/383
[58] Field of Search ................. 24/20 R, 20 LW, 271, 24/279; 285/373, 383, 419

[56] References Cited

U.S. PATENT DOCUMENTS

| | | | |
|---|---|---|---|
| 1,864,339 | 6/1932 | Church. | |
| 3,479,066 | 11/1969 | Gittleman. | |
| 4,438,952 | 3/1984 | Tabor | 285/383 X |
| 4,438,958 | 3/1984 | DeCenzo | 285/373 X |
| 4,813,718 | 3/1989 | Jeanquenin. | |

FOREIGN PATENT DOCUMENTS

| | | |
|---|---|---|
| 617524 | 3/1988 | Australia. |
| 0240646 | 11/1986 | European Pat. Off.. |
| 8232163 | 3/1983 | Fed. Rep. of Germany. |
| 2482250 | 5/1980 | France. |
| 79014 | 9/1951 | Norway .............................. 24/279 |
| 705247 | 3/1954 | United Kingdom ................. 24/279 |

Primary Examiner—Dave W. Arola
Attorney, Agent, or Firm—Irvin A. Lavine

[57] ABSTRACT

A coupling sleeve for connecting thin-walled the ends of pipes comprising a circularly bent sheet-metal strip and a sealing strip lining the inside thereof. A turnbuckle on the sheet-metal strip causes the coupling sleeve to be tightened against the pipe ends. A loosely attached spacing member located approximately at the axial middle of the coupling sleeve in the region of the turnbuckle has an end that projects through the sealing strip into the interior of the coupling sleeve in the untightened condition and is pressed outward, during the tightening of the turnbuckle by an end of the sheet-metal strip and is forced into the elastic inside surface of the sealing strip or into a slit in the sealing strip.

13 Claims, 2 Drawing Sheets

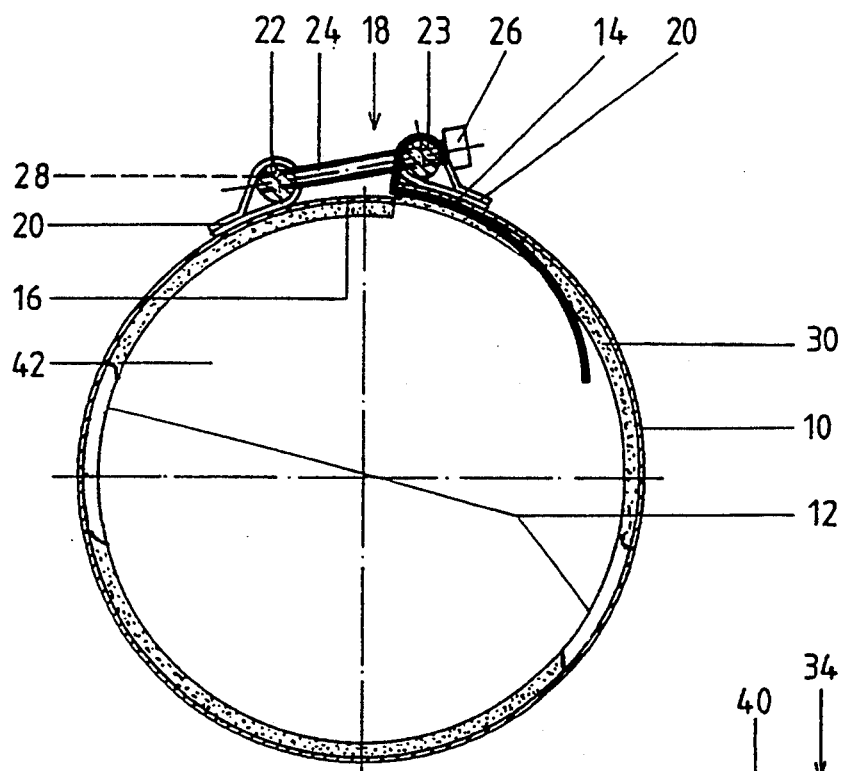
Fig. 1
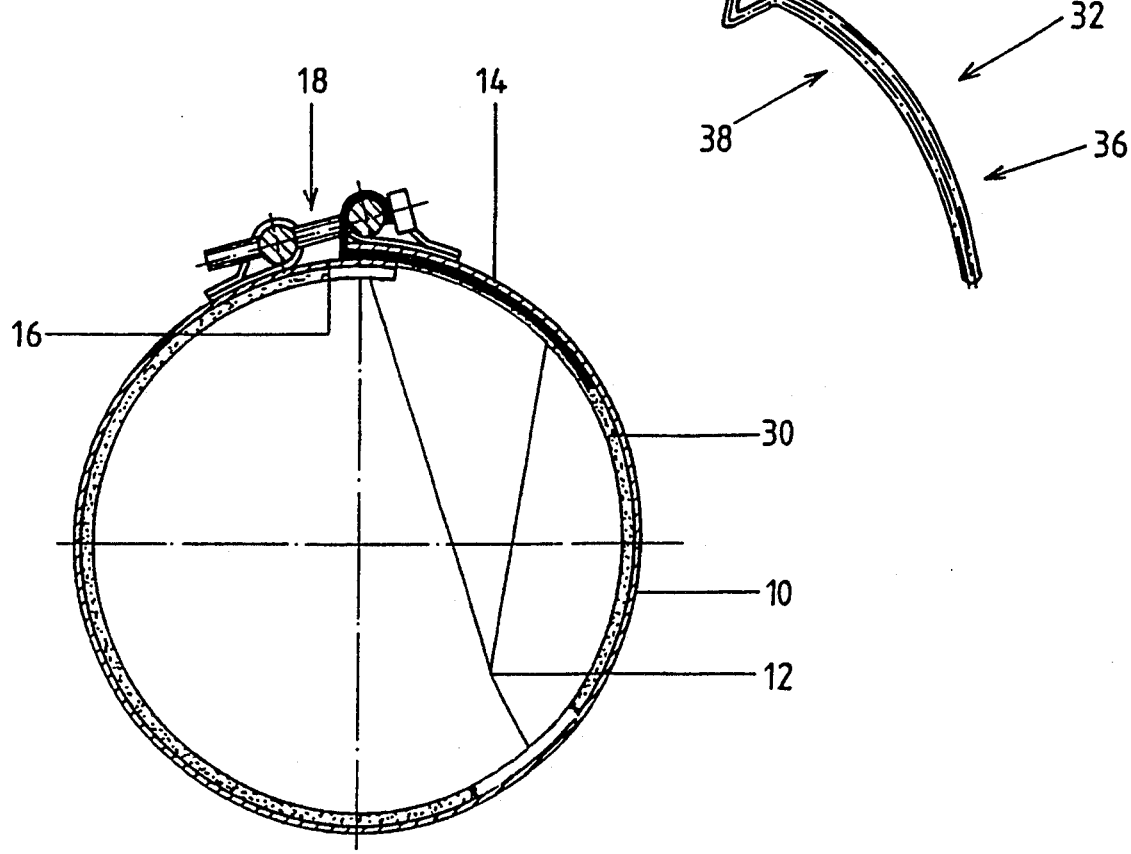
Fig. 3
Fig. 2

COUPLING SLEEVE FOR CONNECTING THIN-WALLED PIPE ENDS

BACKGROUND OF THE INVENTION

The invention relates to a coupling sleeve for connecting the ends of thin-walled pipes.

In known coupling sleeves of this type, it is impossible to ensure that the pipes pushed into the coupling sleeve from both ends will be pushed in by approximately equal lengths, and therefore that a good seal will be achieved at both pipe ends when the coupling sleeve is tightened. Particularly if the diameters of the two pipe ends are unequal, which is the case, for example, in all kinds of very frequently used insertion-type pipe connections, or if the pipe ends are improperly cut, slightly deformed or damaged, it is even more difficult to apply the coupling sleeve to the pipe ends in such a way that these ends will be sealed uniformly against the sleeve and also that an inward projection will not be formed at the packing strips inside the coupling sleeve. Such a projection would hinder the air stream and, especially during vacuuming and chip transport through the pipe, material entrained in the air stream would stick at such a projection. In any case, however, extremely intricate and time-consuming assembly work would be required.

The object of the invention is to provide an improved coupling sleeve of the type mentioned initially such that it can be applied rapidly and simply on the pipe ends and sealed thereagainst without the formation of projections that extend into the pipe interior.

SUMMARY OF THE INVENTION

A coupling sleeve is open at both ends, so that two pipe ends can be pushed into it from both sides, simply and without special care, as far as a stop member in the coupling sleeve, the two pipe ends thus being disposed approximately at the middle of the coupling sleeve. A clamping device preferably comprising a tightening bolt is then tightened. The ends of a sheet-metal strip are caused to overlap increasingly, thus squeezing the middle portion of the spacing member between them. In the final tightened condition, in which the coupling sleeve presses firmly and sealingly against the outside of the two pipe ends, the second end of the spacing member, which at first was projecting inwardly and which functions as a spacer between the pipe ends, is forced so far outward that it is pressed into the inside surface or into a correspondingly long slit of the elastic sealing strip and no longer projects into the interior space. Thereby a largely smooth inside surface of the pipe is achieved at the coupling sleeve. The residual gap between the pipe ends is also substantially filled by sealing-strip material forced inward elastically into this gap. Even pipes cut at a slight angle or pipes having helical seams are thoroughly sealed in this way and form a smooth inside surface together with the coupling sleeve.

The stop member can consist of a suitably bent spring wire; the second end can project inward in the form of a bow, before the coupling sleeve has been tightened. In the tightened condition, this end then is forced to assume approximately the curvature of the pipe interior.

The stop member can be hung simply on the clamping device, e.g., a turnbuckle with axial bolts or the like. The stop member is hung loosely on the clamping device, e.g., a turnbuckle with axial bolts or the like, simply by two stirrups that are bent and or angled outwardly at an angle of about 270°, for example, and that are hung around an axial bolt or other suitable part of the clamping device.

The first end of the stop member can also be secured simply on the outer of the two overlapping ends of the sheet-metal strip it is secured preferably by spot welding.

Particularly good sealing of the coupling sleeve at the pipe ends is achieved if the sheet-metal strip forming the sleeve is rolled in such a way at its axial rims that, during the tightening process, the sealing strip is pressed into the rolled rims and these rims press with metallic adhesion on the outside of the pipes.

BRIEF DESCRIPTION OF THE DRAWINGS

A practical example of the invention is explained in more detail by reference in the drawings, wherein:

FIG. 1 shows a schematic axial section through a first embodiment of the coupling sleeve in untightened condition, FIG. 2 shows a corresponding axial section in tightened condition, FIG. 3 shows an oblique view of a spacing member forming part of the coupling sleeve illustrated in FIGS. 1 and 2.

DESCRIPTION OF THE PREFERRED EMBODIMENTS

Figure 4:
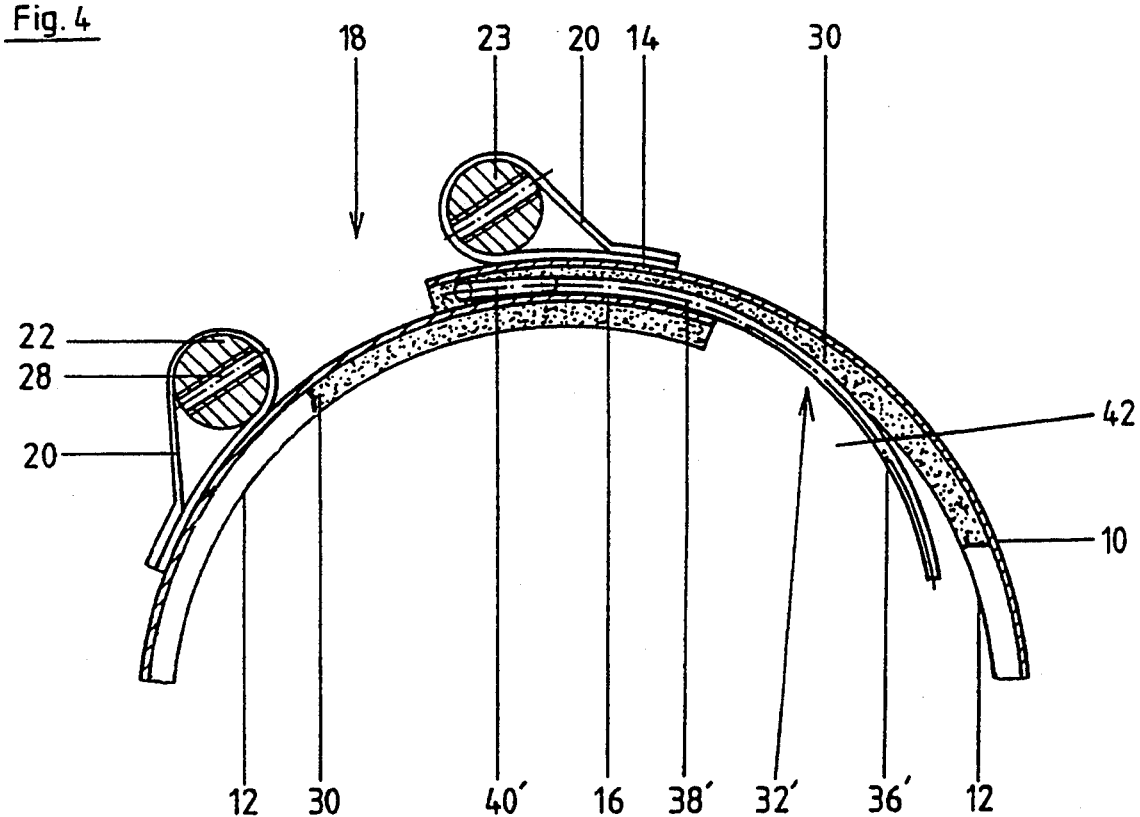
FIG. 4 shows an enlarged partial section, corresponding to FIG. 1, through a second embodiment of the coupling sleeve.

Like reference numbers are used for like parts in all figures.

The coupling sleeve illustrated in the drawings comprises an approximately circularly bent sheet-metal strip 10 with approximately perpendicularly rolled radial rims 12, the ends 14 and 16 of which overlap each other. On the outside of the sheet-metal strip 10 there is applied a turnbuckle 18, which has two shackles 20 fixed on the sheet-metal strip 10, through each of which shackles an axial bolt 22 or 23 is inserted. Through opposite transverse holes of the two axial bolts 22, 23, there is passed a threaded bolt 24, the head 26 of which presses against the one axial bolt 23 and which can be screwed into an internally threaded transverse hole 28 of the opposite axial bolt 22. When the threaded bolt 24 is screwed into the threaded hole 28, the overlapping ends 14 and 16 of the sheet-metal strip 10 are pushed from the untightened position according to FIG. 1 into the tightened position according to FIG. 2, in which they overlap each other to a substantially greater degree, whereby the edges of the rims 12 are brought into firm, metallically adhering contact on the outside of the pipe ends, which are not shown, and on which the coupling sleeve is clamped. A sealing strip 30 that covers substantially the entire inside surface of the sheet-metal strip 10 is thereby pressed firmly and sealingly on the outside of the pipe ends, the axial rims of the sealing strip 30 being retained by the rolled radial rims 12 of the sheet-metal strip 10.

A spacing member 32 illustrated in detail in FIG. 3 consists of spring wire and has a first end 34, a second end 36 and a connecting middle portion 38. The first end 34 has two stirrups 40 in forked arrangement, which stirrups are angled and bent back from the middle portion 38 toward the second end 36 by approximately 270°, and which, during insertion of the spacing member 32 into the coupling sleeve, are hung loosely over the axial bolt 23, partly embracing it in the manner shown in FIGS. 1 and 2. The middle portion 38 and the second end 36 are formed by two parallel sections of the same spring wire lying tightly against each other. After insertion into the coupling sleeve, the middle portion 38 in the untightened condition according to FIG. 1 is located at least partly between the slightly overlapping ends 14, 16 of the sheet-metal strip 10. The second end 36 is bent relative to the middle portion 38 in such a way that it projects through the sealing strip 30 and into the interior space 42 of the coupling sleeve, preferably through a slit provided for this purpose in the sealing strip but not illustrated, which slit runs in the circumferential direction. The two pipe ends can now be pushed axially into the coupling sleeve as far as the stop provided by the inwardly projecting second end 36 of the stop member 32. The connecting bolt 24 is then screwed in and thereby the turnbuckle 18 is tightened, whereby the middle portion 38 and the second end 36 of the spacing member 32 are progressively drawn into a position between the increasingly overlapping ends 14 and 16 of the sheet-metal strip 10, and the inwardly projecting second end 36 is thereby pressed into the elastic inside surface or into the slit of the sealing strip 30. Thus a portion of missing spacing member 32 that projects inwardly and that could hinder the air stream in the pipes that have been connected with each other is no longer present.

Figure 5:
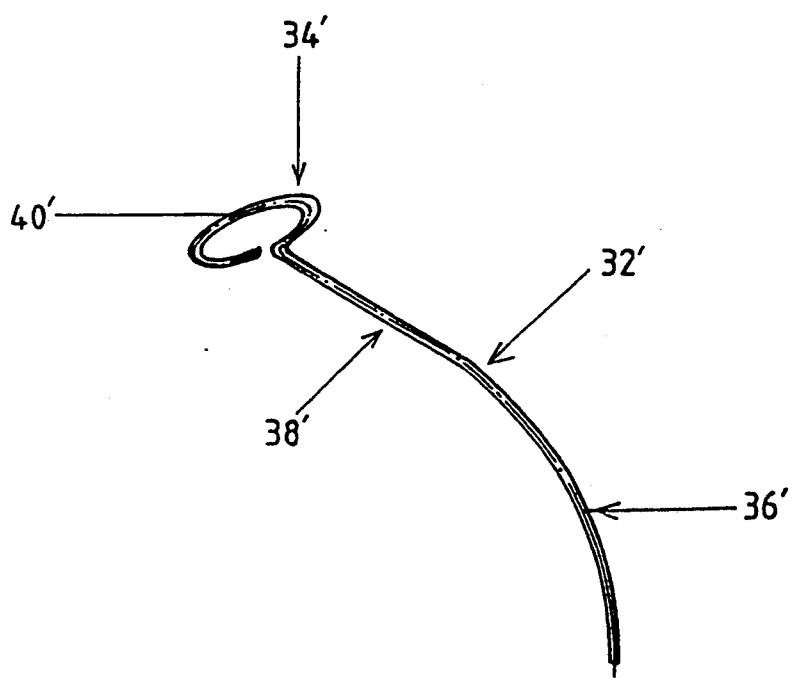
FIG. 5 shows an oblique view of the spacing member forming part of the coupling sleeve illustrated in FIG. 4.

The second embodiment of, illustrated in FIGS. 4 and 5, of the coupling sleeve according to the invention differs from the embodiment of FIGS. 1 to 3 essentially by the simpler construction of the spacing member 32'. In FIG. 4, the threaded bolt 24 of the turnbuckle 18 has been left out for simplicity. The spacing member 32' in this embodiment consists of a single spring wire with middle section 38' and inwardly bent second end 36'. The first end 34' consists of an open ring 40', which is in one piece and is oriented transversely relative to the plane of bending of the second end 36', which ring is attached by spot welding in the embodiment of FIG. 4 to the inside of the outer end 14 of the sheet-metal strip 10. Otherwise the mode of operation of the embodiment according to FIGS. 4 and 5 is the same as that of the first embodiment.

The claims and specification described the invention presented, and the terms that are employed in the clam draw their meaning from the use of such terms in the specification. Some terms employed in the prior art may be broader in meaning than specifically employed herein. Whenever there is a question between the broader definition of such term as used in the prior art and the more specific use of the term herein, the more specific is meant.

I claim:

1. A coupling sleeve for connecting the ends of two thin-walled pipes comprising:
    a tubular sheet-metal strip having overlapping ends,
    a clamping device on the outside of said strip for selectively tightening said sheet-metal strip to decrease the internal diameter thereof
    an elastic sealing strip substantially covering the inside of the sheet-metal strip except for the outer of the two overlapping ends, and
    a resilient stop member having a first end fixed adjacent the overlapping ends of the coupling sleeve, a middle portion extending between said overlapping ends and into said sealing strip, and a second end located approximately at the axial middle of the coupling sleeve and projecting into the interior space within the coupling sleeve and sealing strip when the coupling sleeve is in the untightened condition thereof, the inner one of said overlapping of the sheet-metal strip engaging said stop member and pressing said second end of said stop member into said elastic sealing strip when the coupling sleeve is in the tightened condition thereof.

2. The coupling sleeve according to claim 1, wherein said stop member comprises a spring wire.

3. The coupling sleeve according to claim 2, said stop member second end being arcuate.

4. The coupling sleeve according to claim 1, wherein said first end of said stop member is supported on said clamping device.

5. The coupling sleeve according to claim 4, wherein said clamping device has an axially extending part, the first end of the stop member comprising two outwardly bent stirrups each embracing and rotatable on said axially extending part of the clamping device.

6. The coupling sleeve according to claim 1, wherein said first end of the stop member is fixed to the outer one of the overlapping ends of the sheet-metal strip.

7. The coupling sleeve according to claim 6, wherein said first end of said stop member is fixed by spot welding to said sheet-metal strip.

8. The coupling sleeve according to claim 1, said sheet-metal strip having rolled axial rims and said sealing strip being between and retained by said rolled axial rims.

9. The coupling sleeve according to claim 1, said elastic sealing strip having a circumferentially extending slit for receiving said second end of said stop member in the tightened condition of said coupling sleeve.

10. A coupling sleeve for connecting the ends of two thin-walled pipes comprising:
    a contractible tubular sheet-metal strip having overlapping ends,
    a clamping device on said sheet-metal strip for causing said sheet-metal strip to contract and to cause the ends thereof to be in overlapping position,
    an elastic sealing strip substantially covering the inside of said sheet-metal strip when said strip is the contracted position thereof,
    a stop member having one end connected to said sheet-metal strip and extending generally circumferentially interiorly of said sheet-metal strip, said stop member having a second end remote from the first end thereof projecting inwardly of said sealing strip when said coupling sleeve is in an expanded condition thereof prior to tightening of said clamping device,
    said other end of said sheet-metal strip engaging said stop member upon tightening of said clamping device to contract said coupling sleeve to cause said second end of said stop member to move into a position not substantially inwardly of said sealing strip.

11. The coupling sleeve according to claim 10, wherein said stop member being resilient.

12. The coupling sleeve according to claim 10, wherein said one end of said stop member is connected to said sheet-metal strip by said clamping device.

13. The coupling sleeve of claim 10, wherein said one end of said stop member is fixedly attached to said sheet-metal strip.

* * * * *